(12) United States Patent
Phan et al.

(10) Patent No.: US 9,198,210 B2
(45) Date of Patent: Nov. 24, 2015

(54) D2D COMMUNICATIONS CONSIDERING DIFFERENT NETWORK OPERATORS

(75) Inventors: Vinh V. Phan, Oulu (FI); Ling Yu, Oulu (FI); Kari Horneman, Oulu (FI); Sami-Jukka Hakola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 1007 days.

(21) Appl. No.: 12/763,454

(22) Filed: Apr. 20, 2010

(65) Prior Publication Data

US 2011/0258327 A1   Oct. 20, 2011

(51) Int. Cl.
| | |
|---|---|
| G06F 17/30 | (2006.01) |
| H04W 76/02 | (2009.01) |
| H04W 16/10 | (2009.01) |
| H04W 8/00 | (2009.01) |
| H04W 68/00 | (2009.01) |

(52) U.S. Cl.
CPC ............ *H04W 76/023* (2013.01); *H04W 16/10* (2013.01); *H04W 8/005* (2013.01); *H04W 68/00* (2013.01)

(58) Field of Classification Search
CPC .......................... H04W 16/10; H04L 29/08072
USPC ................................. 709/203, 220; 455/456.3
See application file for complete search history.

(56) References Cited

U.S. PATENT DOCUMENTS

| | | | | |
|---|---|---|---|---|
| 5,903,618 | A | 5/1999 | Miyake et al. | ................. 375/356 |
| 5,995,500 | A | 11/1999 | Ma et al. | ......................... 370/337 |
| 6,415,146 | B1 | 7/2002 | Capece | ......................... 455/426 |
| 7,590,073 | B2 * | 9/2009 | Beckmann et al. | ........... 370/254 |
| 8,666,403 | B2 * | 3/2014 | Yu et al. | ..................... 455/435.1 |
| 2005/0131989 | A1 * | 6/2005 | Beckmann et al. | ........... 709/201 |
| 2005/0239451 | A1 | 10/2005 | Periyalwar et al. | ........... 455/425 |
| 2006/0160544 | A1 | 7/2006 | Sun et al. | ..................... 455/456.1 |
| 2006/0178148 | A1 * | 8/2006 | Du | ....................... H04W 76/023 455/445 |
| 2009/0061901 | A1 * | 3/2009 | Arrasvuori et al. | ......... 455/456.3 |
| 2009/0221325 | A1 | 9/2009 | Periyalwar et al. | ........ 455/552.1 |

(Continued)

FOREIGN PATENT DOCUMENTS

| | | |
|---|---|---|
| WO | WO 2005/053347 A1 | 6/2005 |
| WO | WO 2009/008663 A2 | 1/2009 |
| WO | WO 2009/009379 A1 | 1/2009 |

OTHER PUBLICATIONS

"Multi-Operator Cognitive Radios Sharing One Channel", Al-Dulaimi, et al, (Oct. 2009) pp. 114-117.

(Continued)

*Primary Examiner* — Khanh Dinh
(74) *Attorney, Agent, or Firm* — Harrington & Smith

(57) ABSTRACT

There is stored a database of registration information associating UEs with cells under control of different network operators. In response to a inquiry from a first network operator that a first UE desires direct communications with a second UE, the registration information is used to coordinate between the first network operator and the second network operator to facilitate establishment of a direct communication link between the first UE and the second UE. In various embodiments the facilitating is enhancing the inquiry/page by adding a cell ID of the first UE's cell and adding pre-allocated radio resources in the first UE's cell for use by the second UE in responding to the page, and determining a single network which is not highly loaded and which can allocate resources for the D2D communications and directing one or both UEs to that single network.

17 Claims, 5 Drawing Sheets

(56) References Cited

U.S. PATENT DOCUMENTS

| | | | |
|---|---|---|---|
| 2009/0298500 A1* | 12/2009 | Beckmann et al. | 455/435.1 |
| 2009/0319613 A1* | 12/2009 | Hjelm | H04L 67/16 709/204 |
| 2011/0098043 A1* | 4/2011 | Yu et al. | 455/435.1 |
| 2011/0258327 A1* | 10/2011 | Phan et al. | 709/227 |
| 2013/0159407 A1* | 6/2013 | Koskela | H04L 67/1063 709/204 |

OTHER PUBLICATIONS

Mika Ylianttila et al: "Mobile Plug-and-Play Architecture for Collaborative Hybrid Peer-to-Peer Applications"; IEEE, Piscataway, NJ, USA; Sep. 23, 2008; XP031372302; pp. 1-7.

* cited by examiner

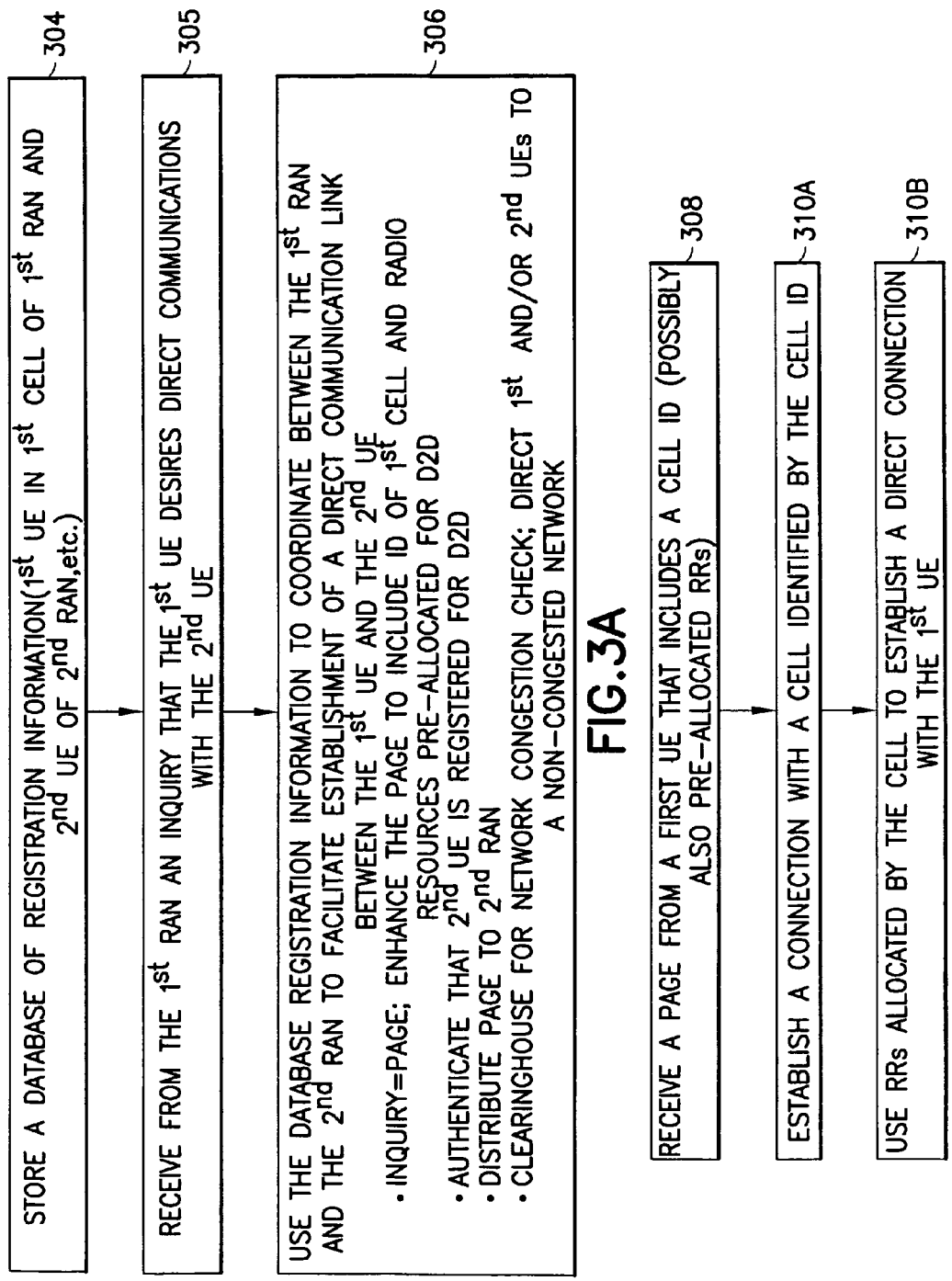

D2D COMMUNICATIONS CONSIDERING DIFFERENT NETWORK OPERATORS

TECHNICAL FIELD

The example and non-limiting embodiments of this invention relate generally to wireless communication systems, including methods, devices and computer programs for communicating in such systems, and more specifically relate to direct communications between mobile devices over allocated resources, also known as device-to-device D2D communications.

BACKGROUND

Acronyms:

| | |
|---|---|
| 3GPP | 3$^{rd}$ generation partnership project |
| AN | access node (such as base station, node B, or e-Node B) |
| D2D | device-to-device |
| DRSF | D2D registration server function |
| E-UTRAN | evolved UTRAN |
| FSU | flexible spectrum use |
| HO | handover |
| LTE | long term evolution (of UTRAN/E-UTRAN) |
| NW | network (RAN) |
| RAN | radio access network |
| RAT | radio access technology |
| RRC | radio resource control |
| UE | user equipment |
| UTRAN | universal terrestrial radio access network |
| WLAN | wireless local area network |

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

D2D communications, alternatively termed mobile-to-mobile (M2M), machine-to-machine (M2M), terminal-to-terminal (T2T) or peer-to-peer (P2P) communications, concerns wireless communications directly between UEs and is targeted for standardization sometime beyond 3GPP LTE Release 10 (also referred to as LTE-Advanced or LTE-A). D2D communications differ from cognitive radio in that in D2D the UEs communicate over radio resources allocated by the host cellular system/base station while in cognitive radio the UEs opportunistically use spectrum 'holes' that happen to go unused by the cellular system. In D2D the cellular network assures interference is controlled by its allocation of radio resources, whereas in cognitive radio the UEs are responsible for avoiding the primary users such as the D2D users and more traditional cellular users. The D2D communications therefore use licensed radio spectrum under supervision and control of the supporting cellular systems, and in fact may use the same radio resources as the supporting cellular systems.

There are several advantages in cellular operators supporting D2D communications, such as: reducing transmitter power consumption; improving spectrum efficiency and network resource utilization; increasing cellular network capacity and coverage; and creating support for additional services such as for example using the D2D devices as relays to form a co-operative mesh-type relay network.

A problem arises in that the D2D devices which desire to communicate directly may be attached to cells of different network operators. Network operators may realize much of the above advantages without supporting inter-RAN D2D, and it is expected that inter-RAN D2D will prove burdensome on network operators. The regular resource allocation, monitor and control mechanisms in current cellular networks are not designed for localized and distributed D2D communications in which user data transmission as well as control signaling (at least in part) happen directly between two or more UEs. Furthermore, the UE is not a trusted entity from the network operators' perspective, and so allowing UEs too much autonomy in directing D2D communications may create a threat of unauthorized usage of radio resources which the operators control.

Two references are relevant. In an article entitled MULTI-OPERATOR COGNITIVE RADIOS SHARING ONE CHANNEL by Anwer Al-Dulaimi and Hamed Al-Raweshidy (MobiWAC '09, Tenerife, Canary Islands, Spain, Oct. 26-27, 2009; published in *Proceedings of the 7th ACM international Symposium on Mobility Management and Wireless Access*, pp. 114-117), the concept of coordinated spectrum sharing among operators/service providers for the secondary usage of the radio resources is explored in which all primary and secondary operators should be connected to the common spectrum broker and any peer user using a channel must get the spectrum broker's agreement. But this reference is not seen to address how to setup a direct communication between peer users from different operators. US Patent Application Publication 2009/0221325 briefly mentions that D2D communication could take place among devices belonging to different operators but is not seen to provide any details as to how such communications might be established.

What is needed in the art is a way to facilitate D2D or other such direct communications between devices/UEs that are operating in different cells under the control of different RAN operators.

SUMMARY

In a first aspect thereof the exemplary embodiments of this invention provide an apparatus comprising at least one processor and at least one memory storing computer program code and a database of registration information for at least a first user equipment and a second user equipment, the registration information associating the first user equipment to a first cell under control of a first network operator and associating the second user equipment to a second cell under control of a second network operator. In this aspect the at least one memory and the computer program code are configured, with the at least one processor, to cause the apparatus at least: in response to an inquiry from the first network operator that the first user equipment desires direct communications with the second user equipment, to use the database registration information to coordinate between the first network operator and the second network operator to facilitate establishment of a direct communication link between the first user equipment and the second user equipment.

In a second aspect thereof the exemplary embodiments of this invention provide a method comprising: storing in at least one memory a database of registration information for at least a first user equipment and a second user equipment, the registration information associating the first user equipment to a first cell under control of a first network operator and associating the second user equipment to a second cell under control of a second network operator; and in response to an inquiry from the first network operator that the first user equipment desires direct communications with the second user equipment, using the database registration information to coordinate between the first network operator and the second network operator to facilitate establishment of a direct communication link between the first user equipment and the second user equipment.

In a third aspect thereof the exemplary embodiments of this invention provide at least one computer readable memory storing computer readable instructions that when executed by at least one processor result in actions comprising: storing in the at least one memory a database of registration information for at least a first user equipment and a second user equipment, the registration information associating the first user equipment to a first cell under control of a first network operator and associating the second user equipment to a second cell under control of a second network operator; and in response to an inquiry from the first network operator that the first user equipment desires direct communications with the second user equipment, using the database registration information to coordinate between the first network operator and the second network operator to facilitate establishment of a direct communication link between the first user equipment and the second user equipment.

In a fourth aspect thereof the exemplary embodiments of this invention provide an apparatus comprising at least one processor and at least one memory storing computer program code. In this fourth aspect the at least one memory and the computer program code are configured, with the at least one processor, to cause the apparatus at least to: determine that a second user equipment is operating in a second cell under control of a second network operator different from a first cell under control of a first network operator to which the apparatus is currently associated; determine that a cell other than the first cell is currently more suitable than the first cell for device to device communications; and handover from the first cell to the determined cell and thereafter send a device to device page to the second user equipment via the determined cell but not via the first cell.

In a fifth aspect thereof the exemplary embodiments of this invention provide a method comprising: determining at a first user equipment that a second user equipment is operating in a second cell under control of a second network operator different from a first cell under control of a first network operator to which the first user equipment is currently associated; determining at the first user equipment that a cell other than the first cell is currently more suitable than the first cell for device to device communications; and the first user equipment handing over from the first cell to the determined cell and thereafter sending a device to device page to the second user equipment via the determined cell but not via the first cell.

In a sixth aspect thereof the exemplary embodiments of this invention provide at least one computer readable memory storing computer readable instructions that when executed by at least one processor result in actions comprising: determining at a first user equipment that a second user equipment is operating in a second cell under control of a second network operator different from a first cell under control of a first network operator to which the first user equipment is currently associated; determining at the first user equipment that a cell other than the first cell is currently more suitable than the first cell for device to device communications; and the first user equipment handing over from the first cell to the determined cell and thereafter sending a device to device page to the second user equipment via the determined cell but not via the first cell.

In a seventh aspect thereof the exemplary embodiments of this invention provide an apparatus comprising at least one processor and at least one memory storing computer program code. In this seventh aspect the at least one memory and the computer program code are configured, with the at least one processor, to cause the apparatus at least: in response to receiving a page from a first user equipment that includes a cell identifier, to establish a connection with a cell identified by the cell identifier and to use radio resources allocated by the cell to establish a direct connection with the first user equipment.

In an eighth aspect thereof the exemplary embodiments of this invention provide a method comprising: receiving a page from a first user equipment that includes a cell identifier; in response to the received page and cell identifier, establishing a connection with a cell identified by the cell identifier; and using radio resources allocated by the cell to establish a direct connection with the first user equipment.

In a ninth aspect thereof the exemplary embodiments of this invention provide at least one computer readable memory storing computer readable instructions that when executed by at least one processor result in actions comprising: receiving a page from a first user equipment that includes a cell identifier; in response to the received page and cell identifier, establishing a connection with a cell identified by the cell identifier; and using radio resources allocated by the cell to establish a direct connection with the first user equipment.

BRIEF DESCRIPTION OF THE DRAWINGS

FIG. 3A is a logic flow diagram that illustrates from the perspective of the DRSF the operation of a method, and a result of execution of computer program instructions embodied on a computer readable memory, in accordance with an exemplary embodiment of the invention.

FIG. 3B is a logic flow diagram that illustrates from the perspective of the UE being paged for D2D communications the operation of a method, and a result of execution of computer program instructions embodied on a computer readable memory, in accordance with an exemplary embodiment of the invention.

DETAILED DESCRIPTION

Figure 1:
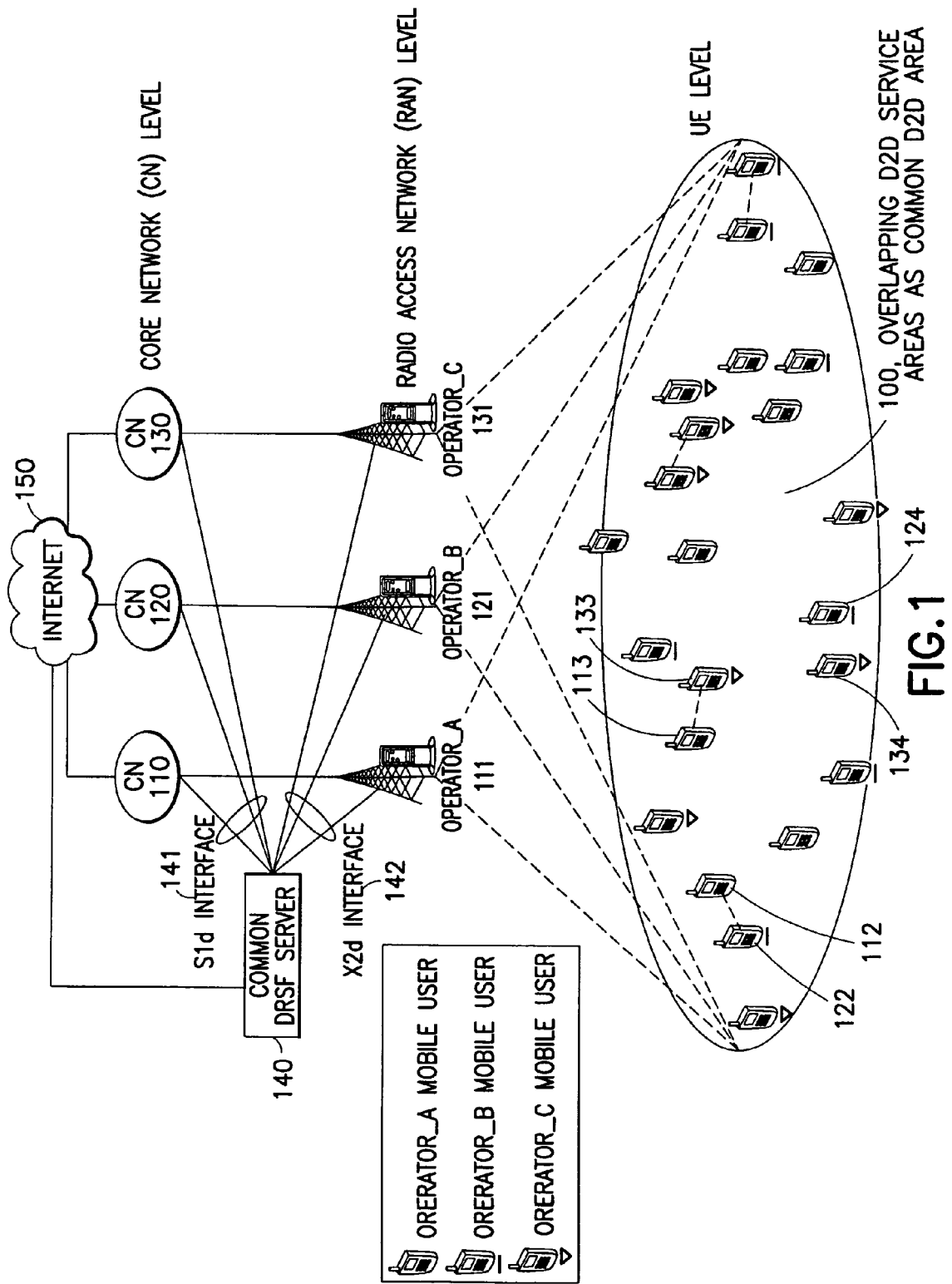
FIG. 1 is a schematic diagram illustrating an exemplary environment in which embodiments of the invention may be practiced, multiple different network operators each controlling different users who are engaging in D2D communications across the operators' networks.

FIG. 1 is a schematic diagram illustrating an environment in which exemplary embodiments of the invention may be practiced to advantage. There is a geographic region or area 100 in which cells of different network operators overlap. For convenience term this a common D2D area 100. By example there are three different networks/RANs operating in the region, assumed to be operated by three different network operators and so there may be some resistance to them enabling seamless interoperability by the various UEs. There is a first operator that includes a first core network 110 and a first access node AN 110, a second operator that includes a second core network 120 and a second access node AN 120, and a third operator that includes a third core network 130 and a third access node AN 130. Each AN controls a respective cell and certain UEs operating within that cell. The D2D common area 100 represents at least a geographic overlap of those three cells.

Assume for example there is a server 140 that stores information relevant to D2D communications for the various UEs in the D2D common area 100. UEs in that area 100 wishing to engage in D2D communications must register to that server 140 which facilitates such D2D communications in a way that is operable across the three different networks. The common D2D area 100 can therefore be referred to as a D2D registration area, and by example the geographic extent of such an area 100 may be along the lines of a mobile location tracking area TA. The D2D registration area 100 has a unique identity and consists of one or more overlapping RAN cells covering a certain geographical area and supporting D2D communications and services. For inter-RAN D2D considerations we assume the D2D area spans an intersection of at least two RAN cells.

While FIG. 1 illustrates the DRSF server 140 as an entity separate and distinct from any of the operator networks, in practice the function of that server 140 may be incorporated in any of the ANs 111, 121, 131, or in any of the CNs 110, 120, 130, or in some combination of CNs and/or ANs and/or separate entity 140. Instead of direct interfaces 141, 142, the operator networks may in an embodiment have access to the separate DRSF server 140 through the Internet 150 via their respective CNs 110, 120, 130.

Any UE entering the D2D registration area 100 and desiring to engage in D2D communications is expected to register to the DRSF server 140, whether to initiate same or to be paged for D2D communications as initiated by another device. The common DRSF server 140 may in one embodiment have a S1d interface 141 with each of the various CNs 110, 120, 130 and also have a X2d interface 142 with each of the various ANs 111, 121, 131. The registering UEs register to the common DRSF server 140 via their AN or CN via one or both of those interfaces 141, 142. This arrangement allows the DRSF system (shown in FIG. 1 as a single server 140) to manage and identify D2D users in a fast and efficient fashion during a D2D connection setup, especially when supporting any UE-initiated D2D connection requests.

In one embodiment the networks automatically register any UE first entering the area 100 unless there is some indication (for example, in the device type identifier) that the particular UE is not capable of D2D communications. In another embodiment the networks automatically register any UE first entering the area 100 only if there is some indication that the particular UE is capable of D2D communications. In yet another embodiment, the networks register to the DRSF server 140 only those UEs in the area 100 that request D2D registration.

Shown at FIG. 1 are three instances of D2D communications across different operator networks. UE 112 is under control of the first AN 111 and directly communicating with UE 122 which is under control of the second AN 121; UE 113 is also under control of the first AN 111 and is directly communicating with UE 133 which is under control of the third AN 131; and UE 134 is under control of the third AN 131 and directly communicating with UE 124 which is under control of the second AN 121. These teachings are most advantageous for the inter-RAN UEs engaging in D2D communications. The description and examples below assume at least two of the UEs in the D2D communications are under control of different network operators, but this is not a limitation to these teachings.

There are other D2D communications between UEs under control of the same RAN or network operator, and these D2D communications may employ certain or all of the specific exemplary teachings below or they may be facilitated entirely by their own network/AN and without use of the DRSF server 140.

While the UEs that are capable of conducting D2D communications may be located within the D2D range of each other, as the subscribers of different cellular network operators in overlapping cellular service areas these UEs may have to select and camp in or connect to different cells of their home operators' networks. This is because in some instances the network operators will choose not to support roaming for mobile users from one another in overlapping service areas and require that the UE camp on a home network cell where one is available. Therefore, it cannot be assured that any cellular network will know the geographic proximity of the UEs that desire to engage in D2D communications, since one network will not know to what cell is attached another UE that subscribes to a different home network. Exemplary embodiments of the invention address how to efficiently support direct D2D communications, including how to effectively coordinate, control and allocate resources to those UEs across multiple operators' administrative domains. Exemplary embodiments conduct such coordinating, controlling and allocating regardless of whether a UE is in a RRC connected state or in an idle state.

The common DRSF 140 and D2D registration area 100 structure are agreed and configured across the different operators' networks which support D2D for the UEs from one another over the same or overlapping service coverage. In an exemplary embodiment of the invention the common DRSF 140 is also responsible for D2D related resource control and management over the common D2D registration area 100, including assisting in enhanced paging of the UE requested for D2D, and also potentially redirecting the UE to the correct cell for the necessary D2D connection setup, and/or also for mediating and coordinating between different RANs for cooperative D2D supports.

Figure 2:
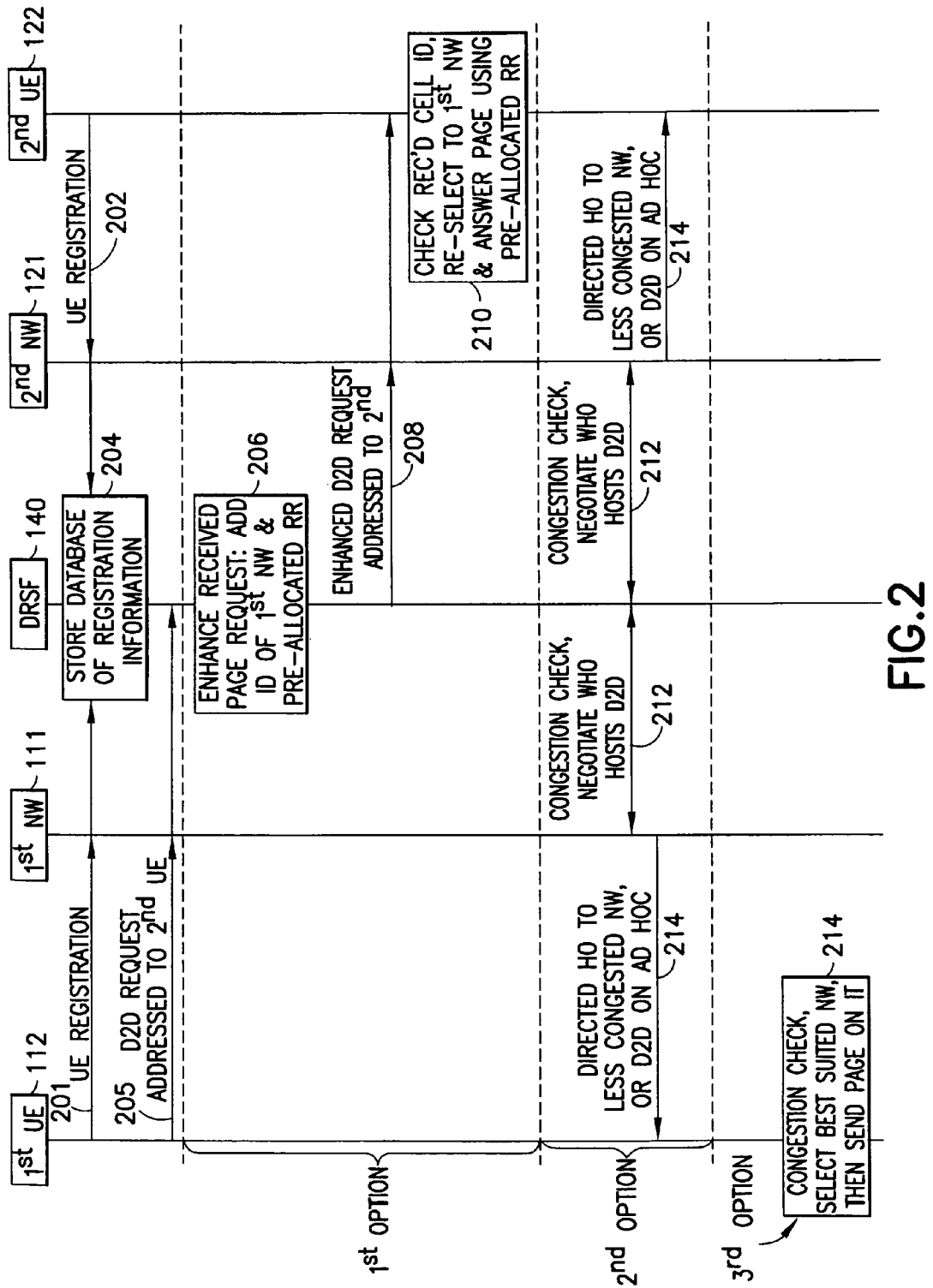
FIG. 2 is an exemplary signaling diagram showing three options for facilitating D2D communications when the two UEs are under control of different networks.

The following description cross references the signaling diagram at FIG. 2 and the logic flow diagrams at FIGS. 3A and 3B for completeness.

The DRSF server 140 has a database of stored registration information for associating the different UEs to the different cells 111, 121, 131, under control of the different operator networks. At FIG. 2 the server 140 compiles 204 this database by receiving the UE registrations 201, 202 from the various different networks (networks NW are numbered in FIG. 2 as the ANs 111, 121), and stores it at block 304 of FIG. 3A. The database has by example information that a first user equipment 112 is registered to a first cell 111 under a control of a first network operator, and information that a second user equipment 122 is registered to a second cell 121 under a control of a second network operator; and so forth for all of the registered D2D devices in the area 100.

Assume for explanation that the first UE 112 seeks a D2D link with the second UE 122. At FIG. 2 the first UE sends at message 205 a D2D request, or more particularly a D2D page, on the uplink to the first cell 111. That page identifies/addresses the recipient second UE 122, and also identifies itself 112 as the sender of the page so that the second UE 122 and any other intermediary nodes can recognize from whom the page originated. The first cell 111 receives that page from the first UE 112, which is then forwarded either by the first cell 111 or the first CN 110 (collectively referred to as the first network operator or NW) to the DRSF server 140 which receives it at block 304 of FIG. 3. Using the registration information at the DRSF server 140 and the page, at block 306 of FIG. 3 the DRFS 140 uses that database registration information to coordinate between the first network operator/RAN and the second network operator/RAN to facilitate establishment of a direct D2D communication link between the first UE 112 and the second UE 122. As above, in general terms the page may be considered a request or an inquiry from the first UE 112 for such D2D communications.

The individual RANs 111, 121 and optionally the CNs 110, 120 are connected to the DRSF 140 via a designated interface as noted above; the X2d interface 142 and the S1d interface 141. There may be other non-cellular operators that are involved in providing D2D services in the same registration area 100 under control or coordination of the DRSF server 140, and in an exemplary embodiment they too have a dedicated interface to the DRSF server 140. Such dedicated interfaces 141, 142 facilitate smart coordination and cooperation between the involved RANs and CNs under mediation and control of the common centralized DRSF server 140. As above, these dedicated interfaces are optional and in an embodiment the Internet 150 can be used as a conduit to the DRSF server 140 instead.

In an exemplary embodiment, there is a D2D registration area identifier ID that is configured to all the involved RANs inside the given D2D registration area 100. Such a D2D registration area ID may be advertised to the UEs by the involved RANs via broadcast system information, for example.

In an exemplary embodiment of the invention the DRSF server 140 enhances the D2D page it receives from the first network operator in a way that facilitates establishment of the direct communication link. In one exemplary embodiment shown at block 206 of FIG. 2 and at the first bullet in block 306 of FIG. 3A, the enhancement is adding to the page specific information about the originated RAN the caller UE 112 is connected to, such as an identifier of the first network operator (for example, cell ID for the first cell 111), which the DRSF server 140 retrieves from the registration database after reading the ID of the first UE 112 from the page it received. The DRSF 140 knows from the registration information for the second UE 122 that it is attached to the second cell 121 (regardless of whether that attachment is currently in an idle or connected mode) and then uses that second cell ID information as the recipient to whom it forwards the enhanced page at message 208 of FIG. 2. The second cell 121 sends the enhanced page that it receives from the DRSF server 140 to the second UE 121.

The second UE may or may not be active with the second cell 121. Particularly but not only if the second UE 122 is in an idle state with the second cell 121, knowing from the page it receives the cell ID of the first cell at which the first UE 111 is camped enables the second UE 121 the option to choose to establish itself directly on the first cell 111 to simplify/facilitate the not-yet established D2D communications with the first UE 111. At FIG. 3B, the second UE receives the page with the ID of the first UE's cell at block 308, and establishes itself on that first cell at block 310 using that received ID. This is all shown at block 210 of FIG. 2, and the whole option of the page being enhanced at the DRSF server 140 is identified as the first option in the signaling diagram of FIG. 2.

In a first alternative embodiment still under that page-enhancing first option of FIG. 2, the requested UE 122 may be paged by its RAN 121 and need to connect to its RAN first. Then, its RAN may redirect the requested UE 122 to the originating first RAN 111 for setting up the D2D connection based upon the relevant information provided by the DRSF server 140. Note that it may be preferable to have an active D2D connection under control of a single RAN for simplicity and efficiency reasons. In this regard, redirecting the requested UE 122 to the originated RAN 111 is a more streamlined approach since often the initiating UE 112 bears the cost of the D2D call. Or in a second alternative the second UE 122 may choose to remain established with the second NW 121 and obtain resources from the second cell 121 for its D2D communications with the first UE 111 which remains established in the first cell 111 for the establishment of D2D communications.

In another exemplary embodiment the DRSF server 140 enhances the page by adding to the page, either instead of the ID of the first cell 111 or in addition to it, radio resources that are pre-allocated in the first cell. This enhanced page makes its way to the second UE 122 similar as was described above and is also shown at blocks 206 and 210 of FIG. 2 and at block 306 of FIG. 3A and block 308 of FIG. 3B. Such pre-allocated radio resources may be used by the second UE 122 for accessing the first cell 111 or direct communications to the first user equipment in reply to the page.

In another exemplary embodiment the DRSF server 140 uses the database registration information to coordinate between the first network operator and the second network operator to facilitate establishment of a D2D link between the first UE 112 and the second UE 122 by authenticating that the second user equipment is registered in the database for device to device communications. This is shown at the second bullet of block 306 at FIG. 3A. As noted above, UEs are not necessarily trusted entities from the perspective of the network operators, and using the DRSF 140 to authenticate that the page recipient 122 is in fact a UE registered in the area 100 for D2D communications serves a purpose to the first network 110/111 which does not have that information about the second UE 122 which subscribes to a different home network.

In this exemplary embodiment the individual RANs may forward D2D call requests from their UEs, those UEs which are allowed to camp in and connect to the individual respective RANs due to subscription profiles, to the DRSF server 140 to authenticate and identify the requested UEs for possible D2D. In case the requested UE 122 that is the addressee of the page or call request is of a different operator and therefore camping in or connecting to another RAN different from that of the caller UE 112 (as is assumed in this example), the DRSF server 140 may determine and distribute the paging request to the correct RAN to page the requested UE 122 to set up the D2D connection as noted above. Or the DRSF server 140 may determine and contact the correct CN 120 for paging the requested UE 122 to set up the D2D connection, for the example case in which the idle mode mobility is managed by a single network entity such as a mobility management entity MME in the case of an LTE core network.

in another exemplary embodiment shown as the second option at FIG. 2, the DRSF server 140 uses the database registration information to coordinate between the first network operator and the second network operator to facilitate establishment of a D2D link between the first UE 112 and the second UE 122 by determining the traffic loading of the various networks that are participating to the D2D registration area 100. In this option the DRSF server 140 can still receive the page, enhance it, and distribute it as noted above. But in this respect the DRSF server 140 is used in a congestion clearinghouse function so information on network traffic loading may be accumulated and compared to make a decision as to which network is best equipped to handle the additional D2D traffic that is to pass over the D2D links yet to be established. The DRSF server 140 may make the decision itself as to which network will sponsor or allocate resources for the D2D communications, or the DRSF server 140 may be used as an intermediary for negotiations between the RANs that may be involved. This congestion clearinghouse function is shown generally at messages 212 of FIG. 2 and the fourth bullet of block 306 at FIG. 3A.

Using the example above in which the first UE 112 in the first network sends a D2D page to the second UE 122 in the second network, then if we assume that it is the first cell 111 that is highly loaded with traffic, the DRSF server 140 can move the D2D communications between the two UEs 112, 122 (and which are not yet established) to the second cell 121. Or the DRSF server 140 can simply coordinate such a move among the two cells 111, 121 by informing them of the networks' comparative congestion status. If conditions permit the first cell 111 can begin a handover of the first UE 112 to the second cell 121 so that not only all of the new D2D traffic between first 112 and second 122 UEs is in the second cell 121 but also the cellular network traffic for the first UE 112 is moved to the second cell 121. This is possible where the two cells 111, 121 are adjacent to one another, a likely scenario since their cellular coverage areas overlap in the D2D area 100. Similar holds true in reverse if it is the second cell 121 that is congested; the pending D2D link is setup in the first cell 111.

If instead it is found that both the first cell and the second cell 121 are congested, it might be possible to move the pending D2D communications to the third cell 131 under control of a third network operator. As an alternative, the pending D2D communications can be moved off the cellular grid and onto a different type of network that does not use radio resources of any of the network operators participating to the D2D area 100. For example, the DRSF server 140 can cause the D2D link to be setup in a WLAN or other ad hoc type network. In any case, all of these examples have the two UEs involved in the page, the sending first UE 112 and the recipient second UE 122 who are at the time the page is sent under control of two different networks, setting up a direct link between them in a single network.

Once the single network is determined and identified, then in a specific embodiment as shown at messages 214 of FIG. 2, the affected networks 111, 121 may direct a handover of their respective UE 112, 122 as necessary to handover to the decided network that is decided to allocate for the D2D communications. For the ad hoc/WLAN option, this is not a true handover but a message directing the UEs 112, 122 to use the WLAN/ad hoc network for their D2D communications.

In an exemplary embodiment the X2d interface 142 may be used by the DRSF server 140 for coordination and cooperation between the involved RANs to support a D2D connection between their respective UEs 112, 122. This may require additional control signaling between the involved RANs via the common DRSF 140, and by example such control signaling can be what is used to re-direct the D2D communications to a non-cellular/ad hoc network, such as via an extended WLAN-LTE interworking. Both the UEs 112, 122 may have certain discontinuous transmission (DTX) and reception (DRX) patterns in their own cellular network that may be configured and controlled in a coordinated manner between the involved RANs via the DRSF server 140 so that such DTX and/or DRX patterns are known by both of the UEs 112, 122. In this manner the individual DTX and/or DRX patterns may be taken into account by the UEs 112, 122 for their D2D communication in any unlicensed spectrum such as that used by the WLAN (the ISM band) while the UEs are still being connected to and controlled by their own RAN.

Specifically, in an exemplary embodiment the database of registration information further stores either or both of the DTX and DRX patterns of the first UE 112 in the first cell 111 and similarly the DTX and/or DRX patterns of the second UE 122 in the second cell 121 (or if not the entire patterns at least information about their DTX/DRX patterns assigned in those cells). Then for the case that the two UEs 112/122 still maintain their association with their respective cells 111/121, the DRSF server 140 with that extended DTX/DRX pattern information can be used to find the appropriate cellular off-cycle times for transmission and reception on the D2D link once that D2D link is setup. The DRSF server 140 may align DRX/DTX patterns of the first UE 112 and the second UE 122, and, if needed, initiate a DRX/DTX reconfiguration of at least one of the UEs with the corresponding serving RAN and then configure the UEs with time cycles used for D2D communications. This is true whether the D2D link is on one of the cellular networks, is across the two cells and two networks, or is on a third network (cellular or ad hoc).

From the perspective of the second UE 122, at least in the embodiment above in which the DRSF server 140 enhances the D2D pages it receives and distributes, the second UE 122 receives at block 308 of FIG. 3B a page from a first UE that includes a cell identifier of the first cell 111. Note that the received page originates from the first UE 112, it is not received directly at the second UE 122 from the first UE 112 but in an embodiment that page first passes through the various networks and is distributed by the DRSF server 140 as noted above. In response to receiving the page with the cell identifier, the second UE 122 establishes at block 310A of FIG. 3B a connection with a cell 111 that is identified by the cell ID, and at block 310B of FIG. 3B uses radio resources allocated by the cell 111 to establish a direct connection with the first UE 112. For the example in which the page includes radio resources pre-allocated in the first cell 111 for D2D communications, the second UE 122 uses those pre-allocated resources to access the first cell 111 or establish a direct connection with the first UE 112. This is true also in the case where the second UE 122 remains established on its own cell 121 for the D2D communications and the D2D link goes across the different RAN cells 111, 121.

Note that enhancing the page does not necessarily mean adding the cell ID to a single paging message. Some systems such as UTRAN/3G use a multi-step process to page a UE, in which the UE ID is sent at a time window during which the assigned DRX period says the UE must listen on a paging channel. If the UE finds its ID in that time window on the paging channel, the UE then goes to another channel to get an allocated DL resource on which the paged UE receives traffic or an allocated UL resource to send its own data. So in the above description, enhancing the page that is distributed to the called UE 122 is not limited only to adding a field or changing bits in a field of the page message that is sent by the sending UE 112.

In addition to any or all of the above various exemplary embodiments, the cell selection and reselection for UEs capable of D2D communications upon entering a given D2D registration area 100 that is common across multiple network operators may be enhanced in that it is the UEs 112, 122 that are allowed to select a best possible local RAN for D2D communications, regardless of whether or not that selected RAN is the UE's home network. In this case the selected RAN, upon initiating or receiving a D2D related request/page to or from a sending UE, is able to check with the common DRSF server 140 for further actions such as for example, to accept or reject the request, to redirect the request, and so forth.

In this regard, upon initiating a D2D call with a called UE 122 camping in a different local RAN in the same area 100, a caller UE 112 may detect and find that the other RAN in which the called UE 122 is camping is more suitable for conducting the D2D call and then the caller UE 112 decides to reselect that RAN for sending the initial D2D request. For example, the first UE 112 may decide, before sending its D2D page that the second cell 121 is less congested than the first cell 111 in which it is currently camped, and so decide to re-select to come under control of the second cell 121 prior to sending its D2D page calling the second UE 122. Such a page can then be handled entirely within the second cell 121 since the D2D communications sought is no longer between UEs under different network operators. This is shown as the third option at FIG. 2 and at block 214 where the UE checks congestion or suitability of the networks and makes the selection itself and sends the page on that selected network after attaching to it.

The detection by the UE of the best suited RAN for D2D can be considered as a part of advanced cognitive radio capability of the UE. For example, the paging UE 112 can, prior to sending its D2D page, make a decision on network suitability for D2D communications by checking a database of spectrum usage information such as is proposed for cognitive radio, or the paging UE 112 can do its own spectrum sensing. However it acquires the spectrum usage information, the paging UE 112 can for example infer network congestion based on how many opportunistic holes there are available for cognitive radio; many such available holes means generally less congestion and more suitable for D2D communications.

So in an exemplary embodiment the first UE 112 would determine that the second UE 122 is operating in a second cell 121 under control of a second network operator, different from the first cell 111 under control of the first network operator to which the first UE 112 is currently associated. The first UE 112 could do this by inquiring of the DRSF server 140, for example by using the ID of the second UE 122 that it desires to call. Or the first UE 112 could detect this via the received beaconing information that the second UE 122 broadcasts. The first UE 112 then determines that there is some cell other than its own first cell 111 (for example, the second cell 121 or a cell of some other RAN) that is currently more suitable for D2D communications than the first cell 111. By example the first UE 112 can do this by checking congestion, which as noted above can be by the first UE 112 doing its own spectrum sensing for the second cell 121 (and possibly also for cells of other RANs) or based on the broadcast information received from the first cell 111 and/or the second cell 121/other cells and/or checking a database of spectrum usage information which may or may not be combined with the DRSF server 140 database associating UEs to cells/operators.

Assuming in this example that the first UE 112 concludes the second cell is less congested and so more suitable for D2D communications, the first UE 112 then hands over/re-selects from the first cell 111 to the second cell 121. In certain cellular systems the UE is enabled to initiate a cell reselection to camp in or to send a service request or a handover sequence or at least request handover from its serving cell. Once handed over and associated to the second cell, the first UE 111 sends a D2D page directly to the second UE 122, which of course if sent via the second cell but not via the first cell. The second network may check and authenticate the first UE 111 with the DRSF server 140 and also inform that the first UE 111 is now associated to the second cell 122 and the DRSF server 140 updates its database to reflect the change.

If the first UE 112 finds some third cell as being more suitable, it may handover to the RAN controlling that third cell and then send its D2D page to the third cell which in this case distributes the D2D page (possibly through the DRSF server 140) to the second cell 121 and to the second UE 122. This is less ideal than the case immediately above where the entire D2D links are within the second cell 121, but may be the best available option if the first 111 and the second 121 cells are both congested. In this instance it may be possible for the second UE 122 to then handover to the less congested third cell, thereby relieving some congestion in the second cell 121.

This exemplary embodiment is particularly advantageous for the case in which the local RANs of different operators are based on different radio technologies or at least different releases of a common core technology (for example, LTE Release 8 versus LTE Release 10). Such different RATs or different releases of the same core RAT may mean the networks have different capabilities or priorities in supporting D2D, or result in different available resources for different load situations for example. One or more of the networks may facilitate or enhance this UE-centric decision on which network the UE selects or re-selects prior to sending its D2D page by configuring or otherwise indicating necessary information including designated policies and parameters, congestion status, and the like. Such information may be made available to the UEs by implicit or explicit control signaling that itself may be common (for example, broadcast) or dedicated signaling.

Figure 4A:
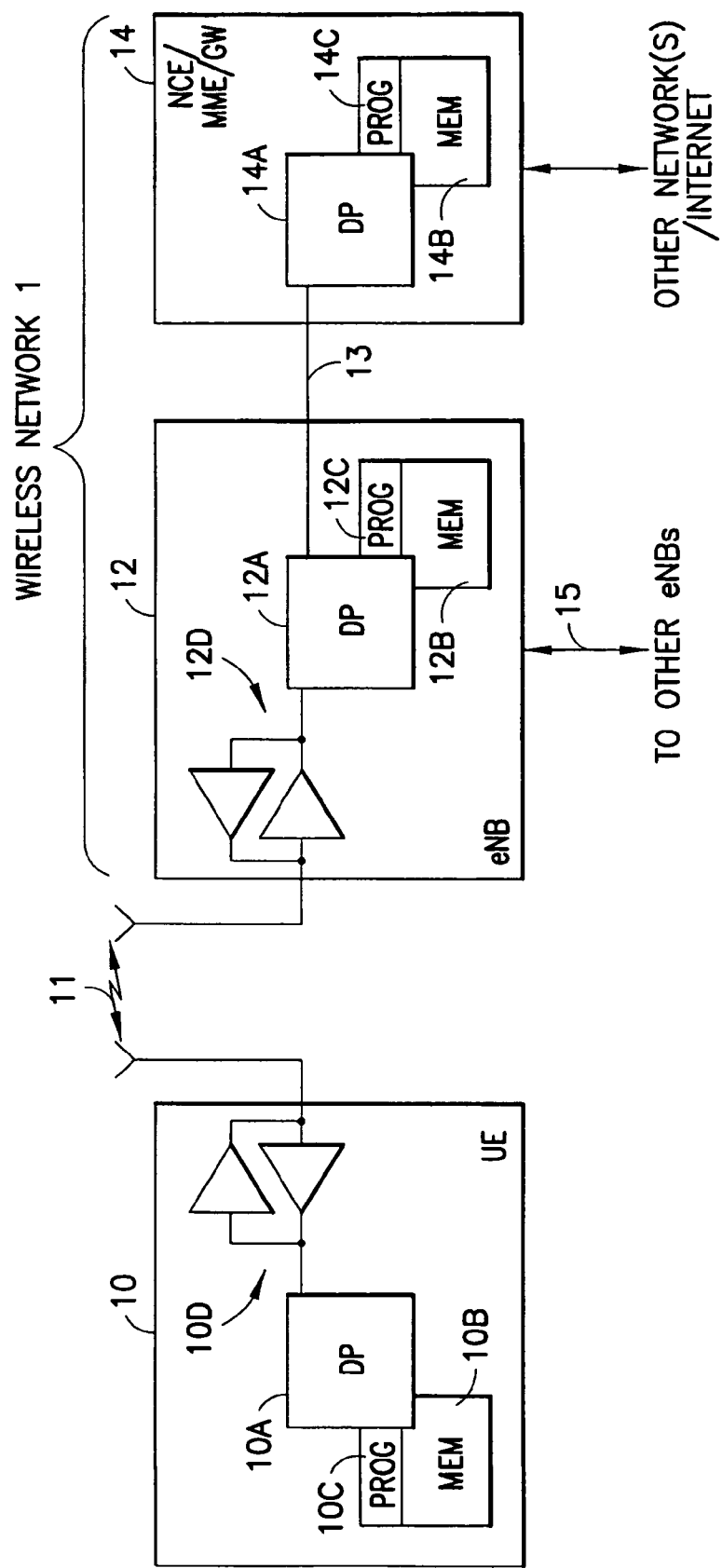
FIG. 4A is a high level schematic diagram of a UE and certain network nodes in which exemplary embodiments of the invention may be practiced.

Reference is now made to FIG. 4A for illustrating a simplified block diagram of various electronic devices and apparatus that are suitable for use in practicing the exemplary embodiments of this invention. In FIG. 4A a wireless network/RAN 1 is adapted for communication over a wireless link 11 with an apparatus, such as a UE 10, via a network access node, such as a Node B (base station), and more specifically an eNB 12. The network 1 may include a network control element (NCE) 14 that may include functionality as a mobility management entity MME and serving gateway GW, and which provides connectivity with a further network such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as an S1 interface. The eNB 12 may also be coupled to another eNB via data/control path 15, which may be implemented as an X2 interface.

At least one of the PROGs 10C and 12C is assumed to include program instructions that, when executed by the associated DP, enable the device to operate in accordance with the exemplary embodiments of this invention, as discussed above by non-limiting examples. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the case in which the functionality of the DRSF server 140 is incorporated into one or more of the network nodes, the eNB 12 and the network control element 14 describe the relevant components. For the case in which the DRSF server 140 is separate and distinct from the network elements, at least in part, the specific components described for the network control element 14 are repeated for such a DRSF server 140, with the exception that the interfaces are as detailed above with respect to FIG. 1.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 4B:
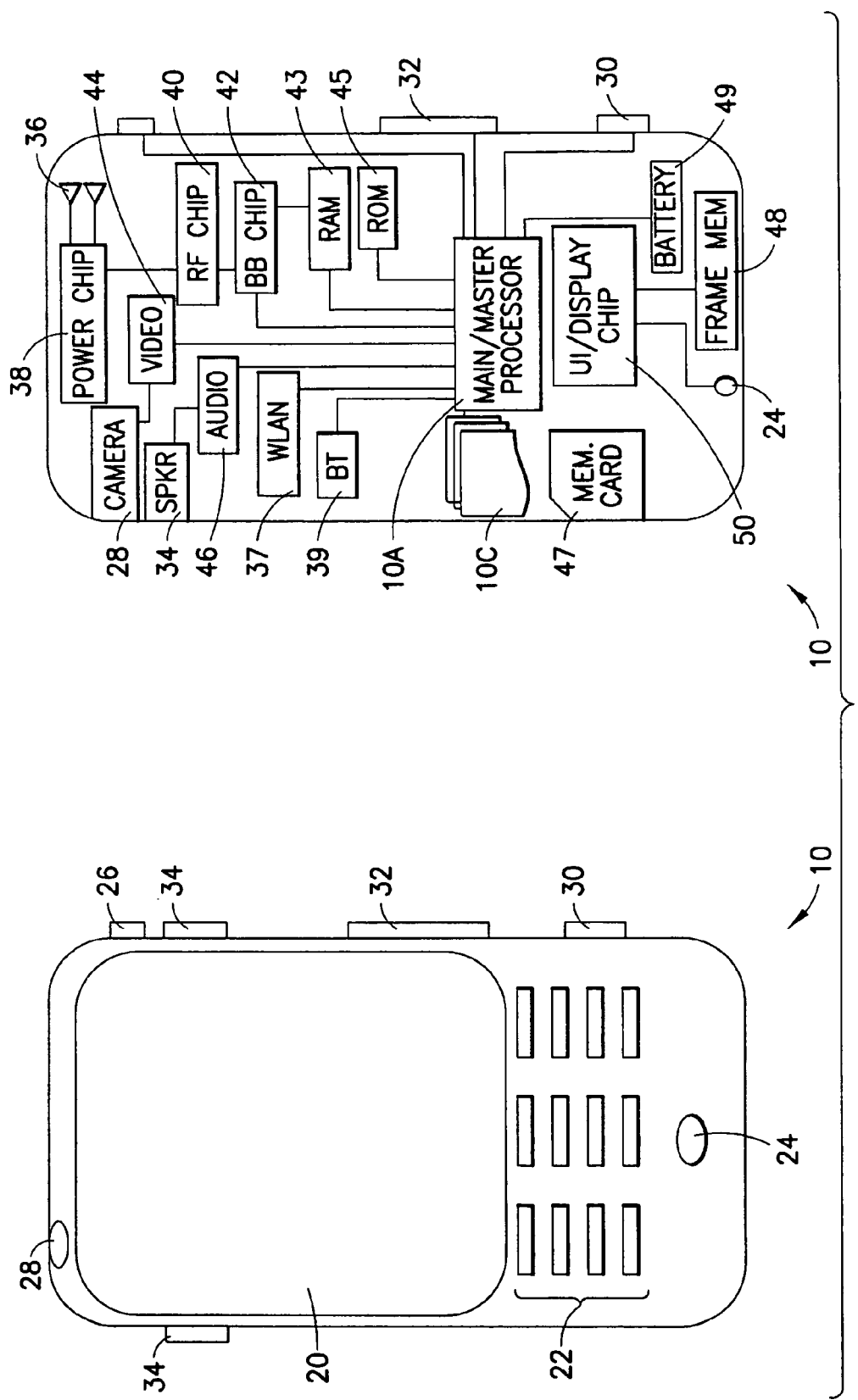
FIG. 4B is a schematic diagram in plan view (left) and sectional view (right) of a mobile handset according to an exemplary embodiment of the invention.

FIG. 4B illustrates further detail of an exemplary UE in both plan view (left) and sectional view (right), and the invention may be embodied in one or some combination of those more function-specific components. At FIG. 4B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user.

The exemplary UE 10 may have a camera 28 controlled by a shutter actuator 30 and optionally by a zoom actuator 32 which may alternatively function as a volume adjustment for the speaker(s) 34 when the camera 28 is not in an active mode. There may also be an image/video processor 44 and/or a separate audio processor 46. The graphical display interface 20 is refreshed from a frame memory 48 as controlled by a user interface chip 50 which may process signals to and from the display interface 20 and/or additionally process user inputs from the keypad 22 and elsewhere.

Within the sectional view of FIG. 4B are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Other embodiments may combine some of the functions described above for FIG. 4B in fewer processors and/or memories. Any or all of these various processors of FIG. 4B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 4B.

Note that the various chips (e.g., 38, 40, 42, etc.) that were described above may be combined into a fewer number than described and, in a most compact case, may all be embodied physically within a single chip.

The various blocks shown in FIGS. 3A-B may be viewed as method steps, and/or as operations that result from operation of computer program code, and/or as a plurality of coupled logic circuit elements constructed to carry out the associated function(s). It should be appreciated that although the blocks shown in FIGS. 3A-B are in a specific order of steps that these steps may be carried out in any order or even some of the steps may be omitted as required.

In general, the various example embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the example embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the example embodiments of the inventions may be practiced in various components such as integrated circuit chips and modules, and that the example embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the example embodiments of this invention.

Various modifications and adaptations to the foregoing example embodiments of this invention may become apparent to those skilled in the relevant arts in view of the foregoing description, when read in conjunction with the accompanying drawings. However, any and all modifications will still fall within the scope of the non-limiting and example embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and example embodiments of this invention may be used to advantage without the corresponding use of other features. As such, the foregoing description should be considered as merely illustrative of the principles, teachings and example embodiments of this invention, and not in limitation thereof.

We claim:

1. An apparatus comprising:
   at least one processor; and
   at least one memory including computer program code, the at least one memory and the computer program code configured, with the at least one processor, to cause the apparatus to perform the following:
   compile a database of registration information for a plurality of user equipments in a plurality of cells under control of a plurality of network operators, the registration information associating a first user equipment with a first cell under control of a first network operator and a second user equipment with a second cell under control of a second network operator different from said first network operator;
   receive an inquiry from the first network operator that the first user equipment seeks direct communications with the second user equipment, said first user equipment and said second user equipment being in an area defined by an intersection of said first cell and said second cell; and
   use the database of registration information to coordinate between the first network operator and the second network operator to facilitate establishment of a direct communication link between the first user equipment and the second user equipment in one of the first cell and the second cell,
   wherein the direct communication link between the first user equipment and the second user equipment, whose establishment is facilitated, is within a single network, and wherein using the database of registration information comprises determining that at least one of the first and the second cells are highly loaded and the single network is not determined to be highly loaded.

2. The apparatus according to claim 1, wherein the inquiry comprises a page from the first user equipment directed to the second user equipment; and wherein using the database of registration information to coordinate between the first network operator and the second network operator comprises enhancing the page to facilitate the establishment of the direct communication link.

3. The apparatus according to claim 2, wherein enhancing the page comprises adding to the page an identifier of the first network operator, the identifier of the first network operator being retrieved from the database, and distributing the page to the second network operator.

4. The apparatus according to claim 3, wherein enhancing the page further comprises adding to the page radio resources that are pre-allocated in the first cell for direct communications from the second user equipment to the first user equipment in reply to the page.

5. The apparatus according to claim 1, wherein the single network is under control of a third network operator different from the first network operator and from the second network operator, and wherein the database of registration information further comprises registration information associating at least a third user equipment to a third cell under control of the third network operator.

6. The apparatus according to claim 1, wherein the single network that is not determined to be highly loaded is an ad hoc network.

7. The apparatus according to claim 1, wherein the database further comprises information about at least one of a discontinuous transmission DTX pattern and a discontinuous reception DRX pattern for the first user equipment in the first cell, and information about at least one of a DTX pattern and a DRX pattern for the second user equipment in the second cell; and wherein the at least one memory and the computer program code are configured, with the at least one processor, to cause the apparatus at least further to use the stored information about the patterns to facilitate times for using the established direct communication link.

8. A method comprising:
   compiling a database of registration information for a plurality of user equipments in a plurality of cells under control of a plurality of network operators, the registration information associating a first user equipment with a first cell under control of a first network operator and a second user equipment with a second cell under control of a second network operator different from said first network operator;
   receiving an inquiry from the first network operator that the first user equipment seeks direct communications with the second user equipment, said first user equipment and said second user equipment being in an area defined by an intersection of said first cell and said second cell; and
   using the database of registration information to coordinate between the first network operator and the second network operator to facilitate establishment of a direct communication link between the first user equipment and the second user equipment in one of the first cell and the second cell,
   wherein the direct communication link between the first user equipment and the second user equipment, whose establishment is facilitated, is within a single network, and
   wherein using the database of registration information comprises determining that at least one of the first and the second cells is highly loaded and the single network is not determined to be highly loaded.

9. The method according to claim 8, wherein the inquiry comprises a page from the first user equipment directed to the second user equipment; and wherein using the database of registration information to coordinate between the first network operator and the second network operator comprises enhancing the page to facilitate the establishment of the direct communication link.

10. The method according to claim 9, wherein enhancing the page comprises adding to the page an identifier of the first network operator, the identifier of the first network operator being retrieved from the database, and distributing the page to the second network operator.

11. The method according to claim 10, wherein enhancing the page further comprises adding to the page radio resources that are pre-allocated in the first cell for direct communications from the second user equipment to the first user equipment in reply to the page.

12. The method according to claim 8, wherein the single network is under control of a third network operator different from the first network operator and from the second network operator, and wherein the database of registration information further comprises registration information associating at least a third user equipment to a third cell under control of the third network operator.

13. An apparatus comprising:
at least one processor; and
at least one memory including computer program code, the at least one memory and the computer program code configured, with the at least one processor, to cause the apparatus, said apparatus being a first user equipment in a first cell under control of a first network operator, at least to:
determine that a second user equipment is operating in a second cell under control of a second network operator different from a first cell under control of a first network operator to which the apparatus is currently associated, said second network operator being different from said first network operator, said first user equipment and said second user equipment being in an area defined by an intersection of said first cell and said second cell;
determine that a cell other than the first cell is currently more suitable than the first cell for device to device communications; and
handover from the first cell to the determined cell and thereafter send a device to device page to the second user equipment via the determined cell but not via the first cell,
wherein the at least one memory and the computer program code are further configured, with the at least one processor, to cause the apparatus to:
determine that the second user equipment is operating in the second cell by checking a database of device registration information that stores an association of the apparatus to the first cell and an association of the second user equipment to the second cell; and
determine that the cell other than the first cell is currently more suitable than the first cell for device to device communications by checking congestion of at least the second cell, and
wherein using the database of registration information comprises determining that at least one of the first and the second cells are highly loaded and the single network is not determined to be highly loaded.

14. The apparatus according to claim 13, wherein checking congestion of at least the second cell comprises checking a database of spectrum usage information.

15. The apparatus according to claim 13 wherein the determined cell is the second cell.

16. A method comprising:
determining at a first user equipment that a second user equipment is operating in a second cell under control of a second network operator different from a first cell under control of a first network operator to which the first user equipment is currently associated, said second network operator being different from said first network operator, said first user equipment and said second user equipment being in an area defined by an intersection of said first cell and said second cell;
determining at the first user equipment that a cell other than the first cell is currently more suitable than the first cell for device to device communications; and
the first user equipment handing over from the first cell to the determined cell and thereafter sending a device to device page to the second user equipment via the determined cell but not via the first cell, wherein
wherein determining that the second user equipment is operating in the second cell comprises checking a database of device registration information that stores an association of the apparatus to the first cell and an association of the second user equipment to the second cell; and
determining that the cell other than the first cell is currently more suitable than the first cell for device to device communications comprises checking congestion of at least the second cell; and
wherein using the database of registration information comprises determining that at least one of the first and the second cells are highly loaded and the single network is not determined to be highly loaded.

17. The apparatus according to claim 1, wherein the apparatus comprises a device to device registration server function.

* * * * *